US011525299B2

(12) United States Patent
Vanderbilt-Kay (10) Patent No.: US 11,525,299 B2
(45) Date of Patent: Dec. 13, 2022

(54) PORTABLE PET DOOR

(71) Applicant: Renee Vanderbilt-Kay, Carlsbad, CA (US)

(72) Inventor: Renee Vanderbilt-Kay, Carlsbad, CA (US)

( * ) Notice: Subject to any disclaimer, the term of this patent is extended or adjusted under 35 U.S.C. 154(b) by 131 days.

(21) Appl. No.: 16/970,311

(22) PCT Filed: Feb. 15, 2019

(86) PCT No.: PCT/US2019/018296
§ 371 (c)(1),
(2) Date: Aug. 14, 2020

(87) PCT Pub. No.: WO2019/161260
PCT Pub. Date: Aug. 22, 2019

(65) Prior Publication Data
US 2021/0079719 A1    Mar. 18, 2021

Related U.S. Application Data

(60) Provisional application No. 62/631,218, filed on Feb. 15, 2018.

(51) Int. Cl.
*E06B 7/32* (2006.01)
*A01K 29/00* (2006.01)

(52) U.S. Cl.
CPC ............... *E06B 7/32* (2013.01); *A01K 29/00* (2013.01)

(58) Field of Classification Search
CPC .................................. E06B 7/32; A01K 29/00
See application file for complete search history.

(56) References Cited

U.S. PATENT DOCUMENTS

| 3,184,803 A | 5/1965 | Peel |
| 3,420,001 A | 1/1969 | Raymon |
| 3,690,299 A | 9/1972 | Johnson |

(Continued)

FOREIGN PATENT DOCUMENTS

| CA | 2367844 A1 * | 7/2003 | ............... E06B 7/32 |
| KR | 101701085 B1 * | 1/2017 | ............... E06B 7/32 |
| WO | 2019161260 A1 | 8/2019 | |

OTHER PUBLICATIONS

International Patent Application No. PCT/US2019/018296, filed Feb. 15, 2019. First Named Inventor: Vanderbilt-Kay.

(Continued)

*Primary Examiner* — Daniel J Troy
*Assistant Examiner* — Daniel Alvarez
(74) *Attorney, Agent, or Firm* — Santangelo Law Offices, P.C.

(57) ABSTRACT

A portable pet door is provided. The portable pet door includes a plurality of panels (101) connected in such a manner that allows the pet door to be folded for portability when not in use. The portable pet door may be installed in a sliding door jamb and configured to be held in place via friction from the sliding door (110) and an adjacent door jamb. The portable pet door has a removable flap (102) located at the bottom of the portable pet door. The portable pet door may have a connector (401) located on a top portion of a top panel of the plurality of panels that allows the pet door to be removably secured to a door jamb.

20 Claims, 9 Drawing Sheets

(56) References Cited

U.S. PATENT DOCUMENTS

| | | | |
|---|---|---|---|
| 3,878,645 A * | 4/1975 | Porter | E06B 7/32 |
| | | | 49/169 |
| D240,812 S | 8/1976 | Imbrecht | |
| 3,997,400 A | 12/1976 | Louie | |
| 4,271,566 A | 6/1981 | Perina | |
| 4,334,573 A | 6/1982 | Hackman et al. | |
| D267,436 S | 12/1982 | Thorne | |
| 5,105,868 A | 4/1992 | Riise | |
| D326,914 S | 6/1992 | Kirk | |
| D334,431 S | 3/1993 | Davlantes | |
| D334,809 S | 4/1993 | Davlantes | |
| D334,810 S | 4/1993 | Davlantes | |
| D382,649 S | 8/1997 | Davlantes | |
| D387,179 S | 12/1997 | Davlantes | |
| D389,247 S | 1/1998 | Norried | |
| D400,265 S | 10/1998 | Davlantes | |
| D406,904 S | 3/1999 | Sronce | |
| D407,500 S | 3/1999 | Gribble | |
| 7,207,141 B2 | 4/2007 | Sullivan | |
| D597,681 S | 8/2009 | Amato | |
| D623,313 S | 9/2010 | Maher | |
| 7,814,956 B2 | 10/2010 | Lethers et al. | |
| 8,567,137 B2 | 10/2013 | Sullivan | |
| 9,388,631 B2 | 7/2016 | Woeltjen | |
| 10,435,942 B1 * | 10/2019 | Dunavin | E06B 7/32 |
| D903,903 S | 12/2020 | Vanderbilt-Kay | |
| 2004/0194725 A1 | 10/2004 | Ozeri | |
| 2005/0126092 A1 | 6/2005 | Guy | |
| 2010/0175336 A1 | 7/2010 | Sullivan | |
| 2010/0269413 A1 * | 10/2010 | Sullivan | E06B 9/52 |
| | | | 49/171 |
| 2011/0232579 A1 * | 9/2011 | Clayson | A01K 13/002 |
| | | | 49/70 |
| 2016/0242392 A1 * | 8/2016 | Holzworth | A01K 15/027 |
| 2017/0247939 A1 | 8/2017 | Carson | |

OTHER PUBLICATIONS

U.S. Appl. No. 62/631,218, filed Feb. 15, 2018. First Named Inventor: Vanderbilt-Kay.
International Patent Application No. PCT/US2019/018296, filed Feb. 15, 2019. First Named Inventor: Vanderbilt-Kay. International Search Report dated Apr. 25, 2019. 5 pages.
International Patent Application No. PCT/US2019/018296, filed Feb. 15, 2019. First Named Inventor: Vanderbilt-Kay. Written Opinion of the International Searching Authority dated Apr. 25, 2019. 7 pages.
Design U.S. Appl. No. 29/680,400, filed Feb. 15, 2019. First Named Inventor: Vanderbilt-Kay.
U.S. Appl. No. 62/937,063, filed Nov. 18, 2019. First Named Inventor: Vanderbilt-Kay.
U.S. Appl. No. 29/680,400, filed Feb. 15, 2019. First Named Inventor: Vanderbilt-Kay. Non Final Office Action dated Feb. 27, 2020. 8 pages.
U.S. Appl. No. 29/680,400, filed Feb. 15, 2019. First Named Inventor: Vanderbilt-Kay. Notice of Allowance dated Jul. 21, 2020. 5 pages.
PetAge PopUp Pet Door https://www.petage.com/product/pop-up-pet-door/ Posted Dec. 6, 2018 (Year: 2018). 1 page.
Introducing The Pop Up Pet DoorTM The Pet Blog Lady https://www.petbloglady.com/2018/11/introducing-the-pop-up-pet-door.html. Posted Nov. 22, 2018 (Year: 2018). 4 pages.

* cited by examiner

PORTABLE PET DOOR

CROSS REFERENCE TO RELATED APPLICATIONS

This application is the US National Phase of International Application No. PCT/US2019/018296, filed Feb. 15, 2019, which claims the benefit of U.S. Provisional Application No. 62/631,218 filed on Feb. 15, 2018. The above identified patent applications are herein incorporated by reference in their entirety to provide continuity of disclosure.

FIELD OF THE INVENTION

The present invention relates to a portable pet door. More particularly, the present invention provides a portable pet door that is foldable for storage or transport, and that is extendable for installation within a doorway for use by a pet.

BACKGROUND OF THE INVENTION

Many people find enjoyment in owning and taking care of pets. Some of these pets need to go in and out of the house frequently. Dogs in particular like to pretend they have to go out just to receive treats when returning to the house. Often pet owners are forced to constantly get up or interrupt what they are doing to open a door to let an eager pet outside. Although, installing a traditional pet door could reduce unnecessary interruptions for pet owners, it could also require cutting a hole in an existing door or replacing the entire door. This can be expensive and messy. Further, if not properly installed or insulated, a traditional pet door can leak or allow cold air into a home. Many existing pet doors have a frame that goes around the entirety of the pet door. This can cause issues for pets with bad legs or hips as they may not be able to raise their legs over the edges of the frame.

Consequently, there is a need for an improvement in the art of pet doors. The present invention substantially diverges in design elements from the known art, and solves a problem faced by pet owners daily by allowing their pets to go outside at will without changing an existing door structure. In this regard, the present invention substantially fulfills unmet needs.

SUMMARY OF THE INVENTION

The present invention provides a portable pet door wherein the same can be utilized for providing convenience for the user to allow their pets to enter and exit a house according to the will of the pets. The present system comprises a portable pet door, wherein the door is removably securable to an existing door structure. The portable pet door includes a plurality of panels hingedly connected together, such there is at least one upper panel and at least one lower panel. A connector is placed on a top portion of the upper panel, wherein the connector is configured to removably secure the portable pet door to a door jamb or other attachment surface.

An object of the present invention is to provide a portable pet door that can be moved between a folded configuration for storage or transport and an expanded configuration for use within an existing door structure.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in conjunction with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the portable pet door. For the purposes of presenting a brief and clear description of the present invention, a preferred embodiment will be discussed as being used for providing a portable pet door. The figures are intended for representative purposes only and should not be considered to be limiting in any respect.

Figure 1:
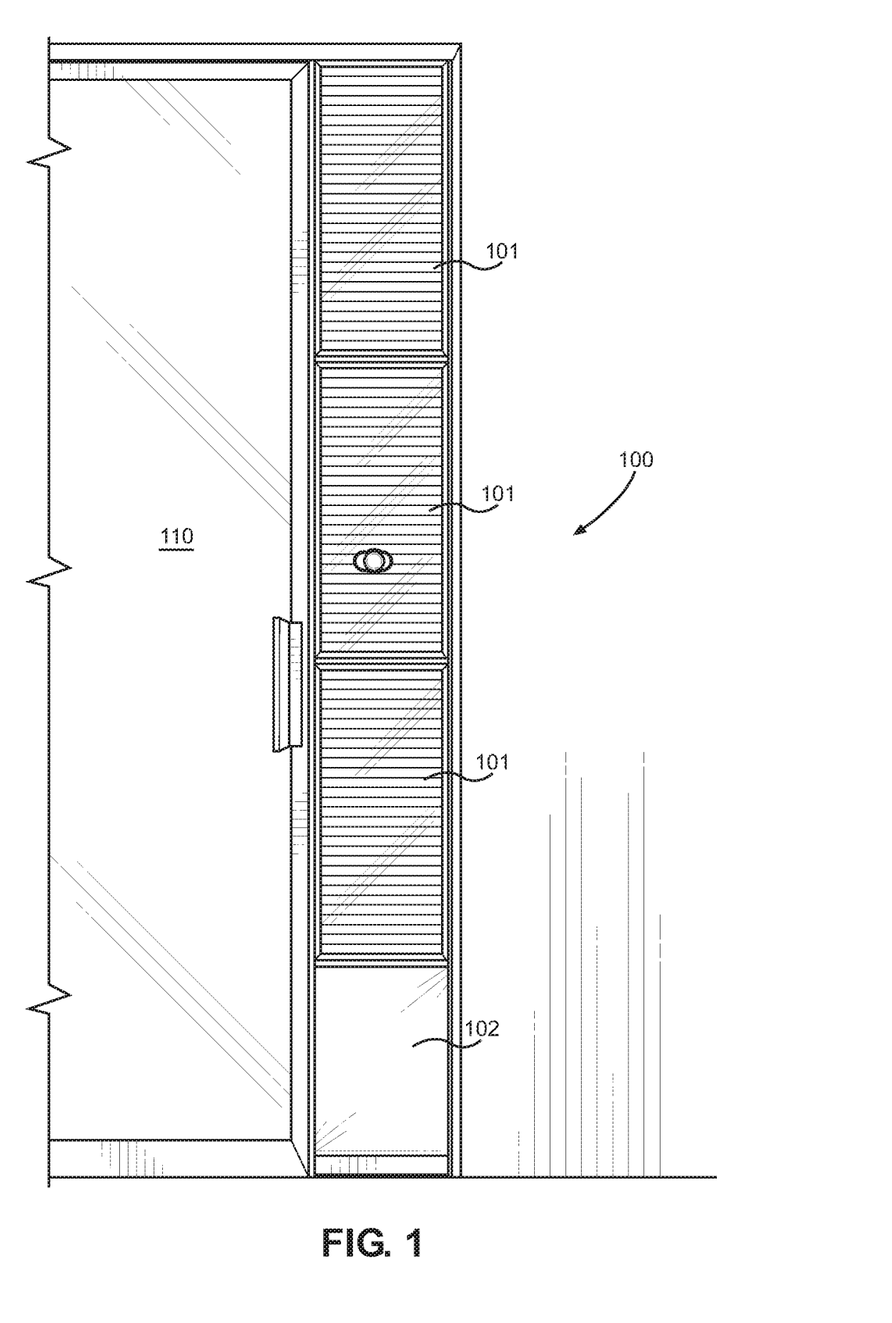
FIG. 1 shows a front view of an embodiment of the portable pet door installed in a sliding door structure.

Referring now to FIG. 1, there is shown a front view of an embodiment of a portable pet door 100 installed in a sliding door 110 structure. The portable pet door 100 includes a plurality of panels 101 that are pivotally secured to each other in a linear arrangement. Each panel 101 is pivotally connected to at least one other panel 101, such that the panels 101 can move between a retracted configuration for storage or transport, and an expanded configuration for use. The portable pet door 100 also has a pet flap 102 connected to a lower end of the lower panel. The pet flap 102 is capable of bending or flexing to allow the pet to move through the door. In one embodiment, the pet flap 102 is attached along an upper edge thereof to the lowermost panel 101, such that the flap can flex inwardly or outwardly to allow a pet to enter or leave the building. In another embodiment, the upper edge of pet flap 102 is rotatably coupled to the lowermost panel 101, which allows the entire pet flap 102 to rotate as the pet enters or exits the building.

Figure 2:
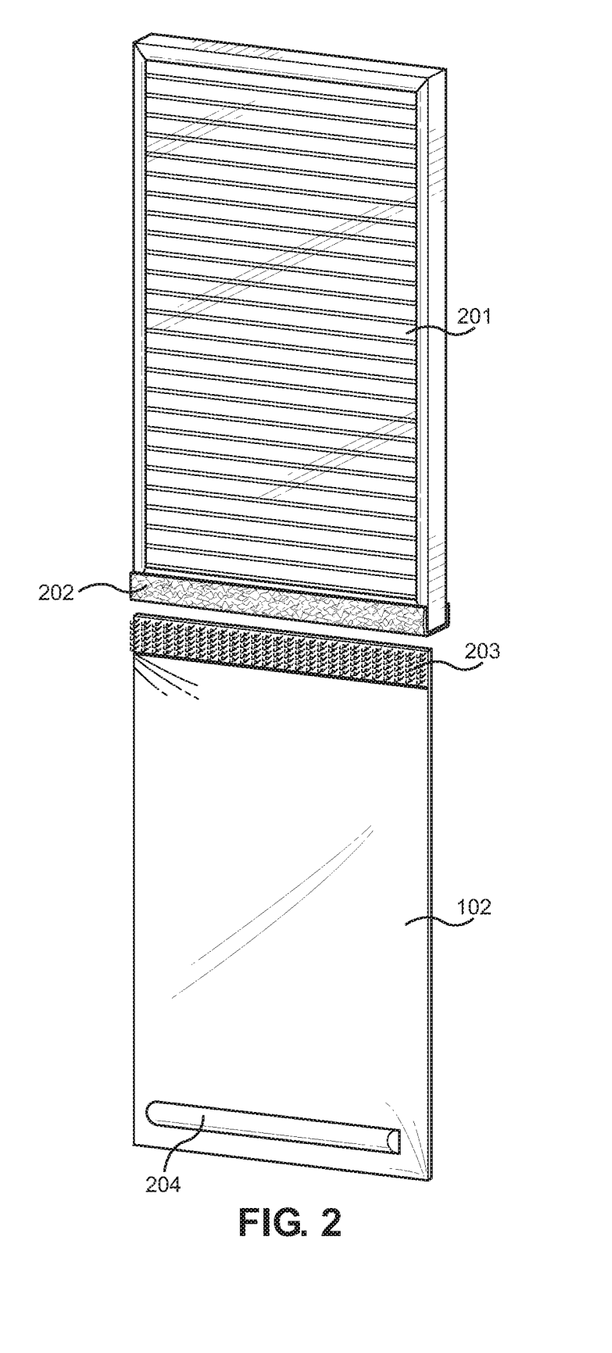
FIG. 2 shows an exploded view of an embodiment of the portable pet door, with the pet flap detached from a lower panel.

Referring now to FIG. 2, there is shown an exploded view of an embodiment of the portable pet door, with the pet flap detached from a lower panel. In the illustrated embodiment, the lowest panel 201 includes a connecter 202 attached thereto. The connector may be a first portion of a hook and loop connector. In the illustrated embodiment, the portable pet door further includes a second connector 203 attached to a top portion of the pet flap 102. The second connector 203 may be a second portion of a hook and loop connector. While hook and loop connectors are utilized in the shown embodiments, any other suitable fasteners or combination of fasteners may be utilized, such as magnets, adhesives, snaps, and the like. The pet flap 102 may be composed of a rubber material or other flexible materials. There is no frame around the pet flap 102, which eliminates the opening size restriction of typical pet doors and enables animals with hip problems to easily use the door. In one embodiment, the pet flap 102 is proportioned to fit snuggly with a sliding door and a door jamb while still being movable. In some embodiments, a raised portion 204 is disposed on the lower end of the pet flap 102. The raised portion 204 biases the pet flap 102 to a vertical, closed position, and further functions as a weight to keep the pet flap from being blown open. In this manner, the portable pet door seals the interior from the exterior when not in use.

Figure 3:
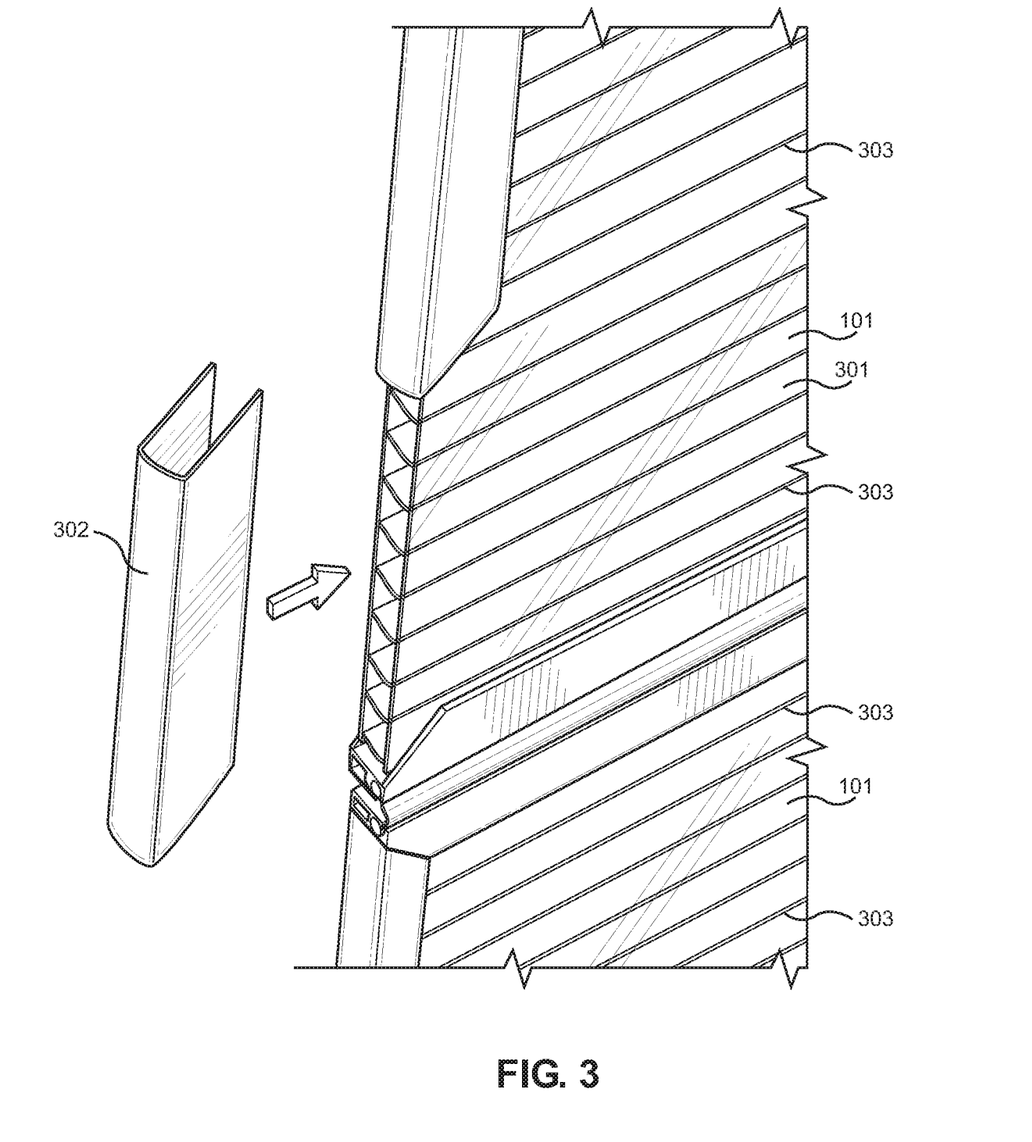
FIG. 3 shows an exploded view of an embodiment of the portable pet door, with an outer material removed from the lower panel.

Referring now to FIG. 3, there is shown an exploded view of an embodiment of the portable pet door, with an outer material removed from the lower panel. In the illustrated embodiment, the panels 101 of the pet door include an inner material 301 and an outer material 302. Each panel includes an inner sheet, an outer sheet, and a plurality of ribs 303 disposed therebetween. Each rib 303 is oriented perpendicularly to the inner and outer sheets. Further, each rib 303 extends between opposing side edges of the sheets, such that the longitudinal edges of the ribs are affixed to interior faces of the inner and outer sheets. The ribs 303 are spaced equally from each other with respect to the upper and lower ends of the sheets. The ribs 303 provide structural strength and further define a gap between the inner and outer sheets. The gap allows air to be trapped between the sheets to insulate the panel, thereby maintaining the room which the door accesses at a desired temperature. In other embodiments, the panels further include insulation materials disposed therein. This insulation will help to prevent inclement weather entering the home through the door, thereby maintaining the home at a desired temperature.

In the shown embodiment, the outer material 302 comprises a base having a pair of sidewalls extending perpendicularly outwardly from opposing longitudinal edges thereof, defining a U-shaped cover member. The cover member is secured over a perimeter edge of the panel, such that the edge of the panel is disposed within the cover member channel and contacts an interior side of the base of the cover member. The cover member further improves the structural integrity of the pet door and prevents damage from being done to the perimeter edges of the panels during use, installation or removal of the pet door. In some embodiments, the cover member is integral to the panel and acts as an outer edge to retain insulation materials within the panel. In other embodiments, the cover member may be removably secured to the panel, as shown in FIG. 3. This allows the cover member to be removed for cleaning of the pet door if needed.

Figure 4:
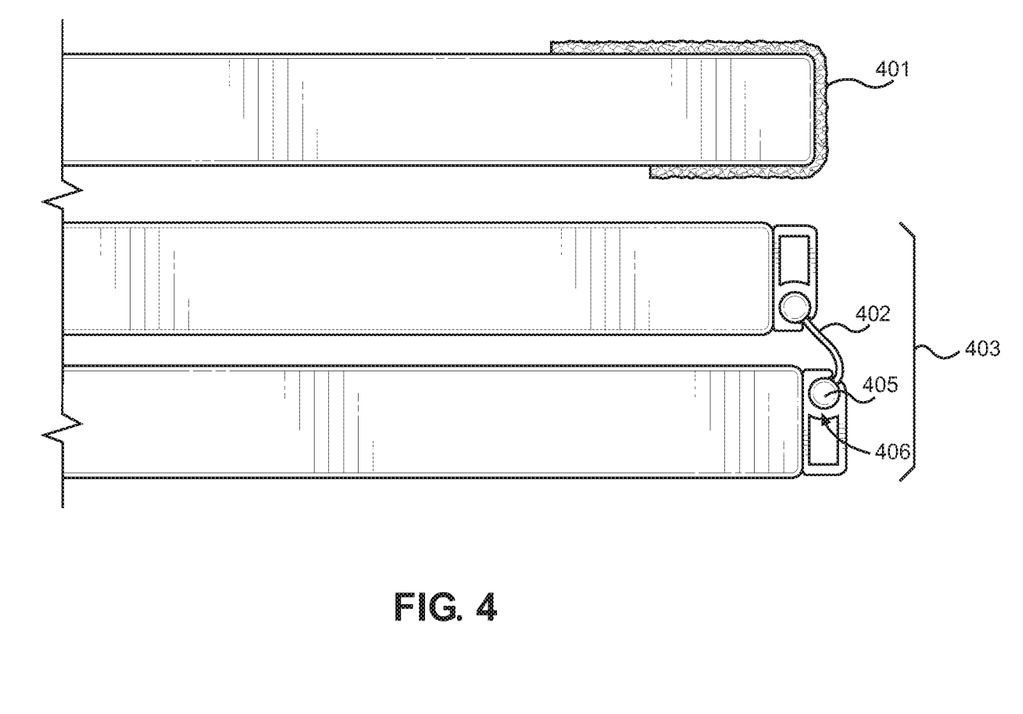
FIG. 4 shows a side view of an embodiment of the portable pet door in a folded configuration.

Referring now to FIG. 4, there is shown a side view of an embodiment of the portable pet door in a folded configuration. The pet door is capable of being stored in a folded configuration. In one embodiment, the plurality of panels are hingedly connected. The hinge 403 may be created using an insert 402. The insert 402 includes a flexible member having an expanded section 405 disposed on opposing ends thereof. The expanded section 405 is configured to be frictionally secured in a recessed portion 406 of the hinge 403. The hinge 403 creates a secondary panel that prevents outside air from entering the home through any gaps that may exist between individual panels. In this way, the hinge 403 helps to insulate the door and prevents the home from having an opening directly to the outside.

The pet door further includes a fastener, illustrated as a hook and loop connector 401, placed along the top of the upper most panel. The hook and loop connecter 401 will allow the door to be secured to a second part of the hook and loop connecter that has been secured to an upper portion of the door jamb. This will allow the portable pet door to remain in place even if there is not enough pressure from a sliding door to hold the door in place. In a further embodiment, a second hook and loop connector may be placed on the side of the panels. This connector can be used to add an additional connection to the side of the door jamb. While hook and loop fasteners are shown in the illustrated embodiment, any other suitable type of fastener may be utilized.

Figure 5:
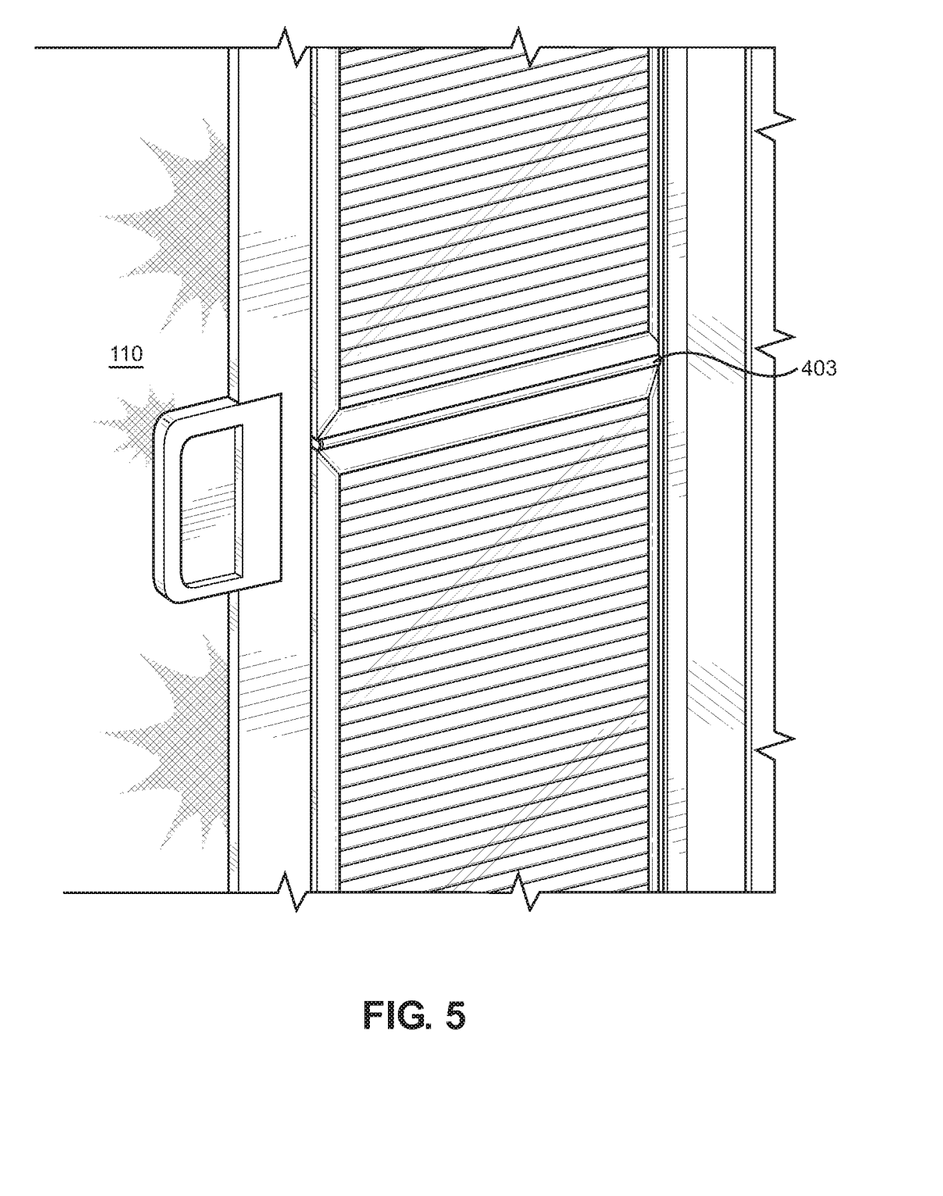
FIG. 5 shows a zoomed view of an embodiment of the portable pet door installed within an existing sliding door structure.

Referring now to FIG. 5, there is shown a zoomed view of an embodiment of the portable pet door installed within an existing sliding door structure. The hinge 403 connecting adjacent panels extends transversely across the doorway. This hinge 403 covers the entire gap between the panels. In operation, a user installs the portable pet door in a door jamb of a sliding door 110, such that the portable pet door is positioned between the door jamb and the leading edge of the sliding door 110. The sliding door 110 can then be slid closed to apply pressure to the pet door. The pressure applied is sufficient to hold the portable pet door and keep the pet door in place. In one embodiment, a rod or board can be placed behind the door in order to keep the door from opening further than needed. Further, the fastener connection between the uppermost panel and the fastener disposed on the upper end of the door frame allows the portable pet door to remain secured in the installed configuration even if the sliding door is opened and pressure is relieved.

Figure 6A:
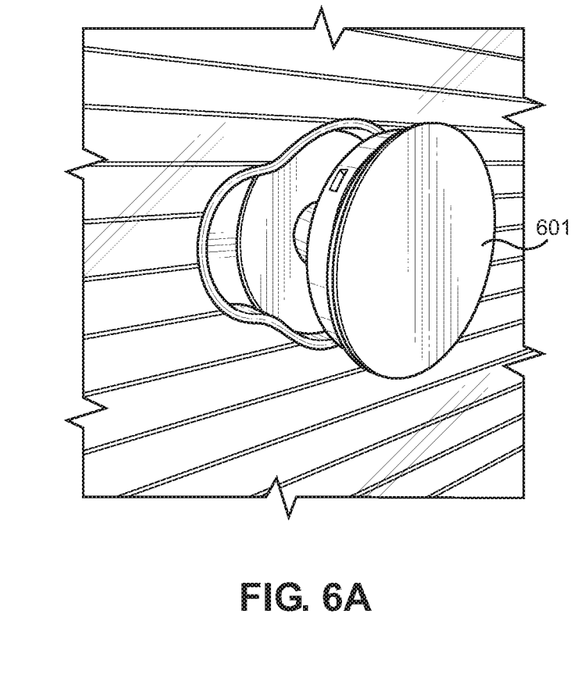
FIG. 6A shows a perspective view of an embodiment of the portable pet door with the knob component in an expanded position.
Figure 6B:
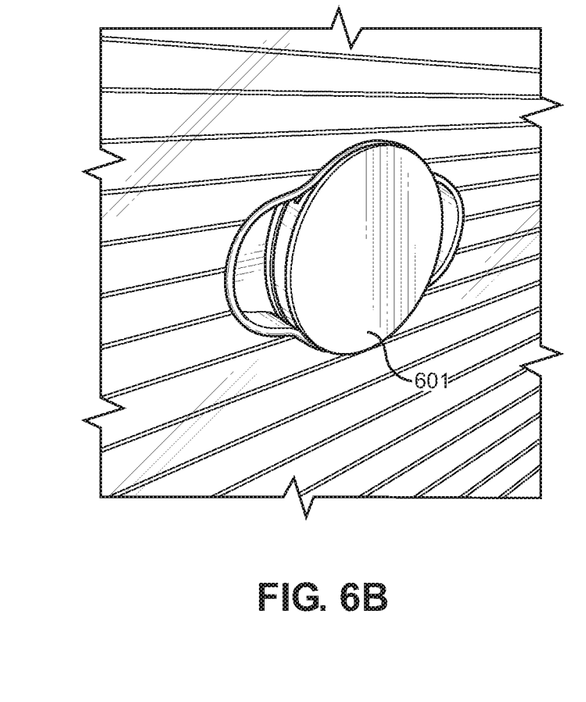
FIG. 6B shows a perspective view of an embodiment of the portable pet door with the knob component in a recessed position.

Referring now to FIG. 6A and FIG. 6B, there are shown a zoomed view of an embodiment of the portable pet door with a knob in an expanded position, and a zoomed view of an embodiment of the portable pet door with a knob in a recessed position, respectively. The knob 601 is affixed to one of the panels and is configured to move between a recessed position and an expanded position. When in the expanded position, the knob 601 is pulled away from the portable pet door, as shown in FIG. 6A. In this embodiment, the knob 601 may be used to manually hold the portable pet door up while it is being installed. Once the door is installed, the knob 601 can be pushed inwardly and moved to the recessed position, as shown in FIG. 6B. In some embodiments, the outer surface of the knob 601 aligns flush with an outer surface of the portable pet door when the knob 601 is in the recessed position. In this embodiment, the knob 601 is less likely to be caught on clothes or other surfaces. The ability for the knob 601 to move from a expanded to a recessed position also facilitates moving the pet door itself between a folded configuration and an expanded configuration.

Figure 7:
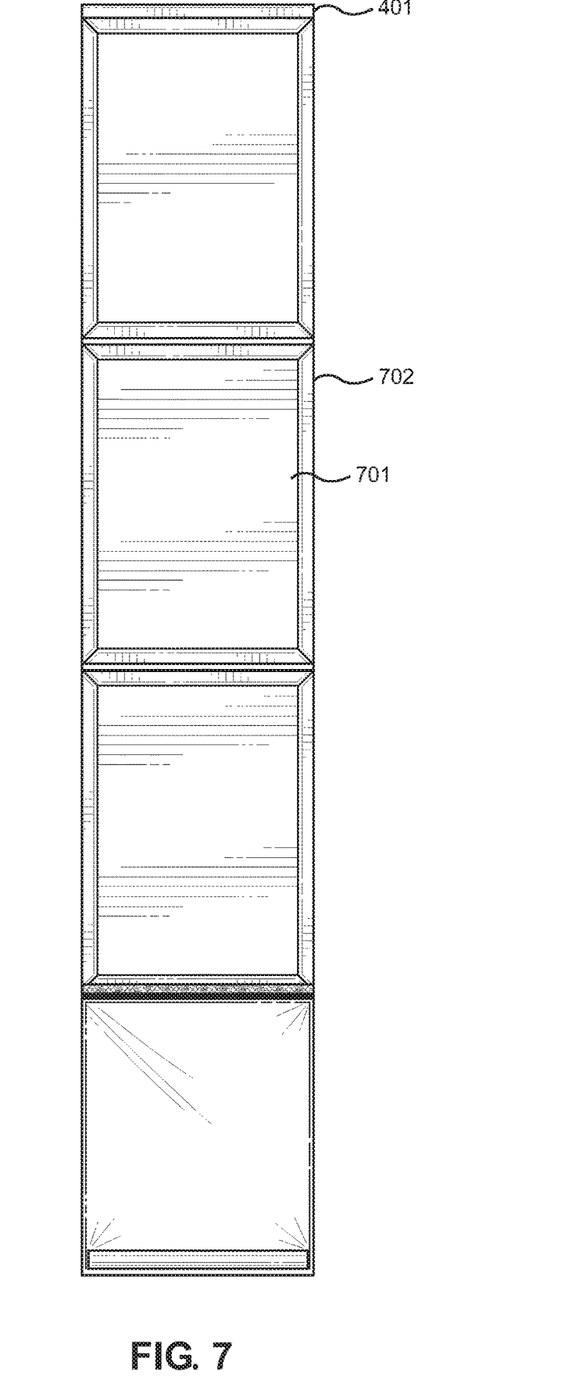
FIG. 7 shows a front view of an alternative embodiment of the portable pet door with solid panels.

Referring now to FIG. 7, there is shown an alternate embodiment of the portable pet door with solid panels. In this embodiment, the panels are made out of a single material. The panels are hollow to allow for an element such as insulation or a vacuum to be placed therein. In one embodiment the panels are made with the same material and have no distinguishing features between the interior and the perimeter. In another embodiment, the panels have a flexible interior 701 and a solid perimeter 702, such that the sliding door can be slid against the panel applying pressure. In this embodiment the ribs are removed. In this embodiment, a connector 401 is placed on an upper end of the top panel.

Figure 8:
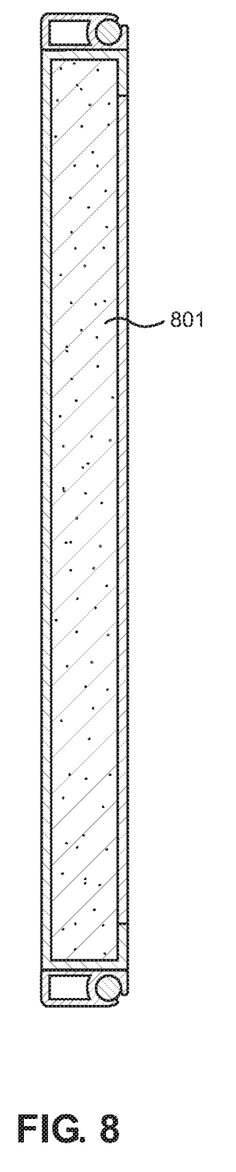
FIG. 8 shows a cross-sectional view of an embodiment of a single panel filled with an insulative material.

Referring now to FIG. 8, there is shown a cross-sectional view of an embodiment of a single panel filled with an insulative material. In one embodiment, the insulation 801 is a spray-in insulation. This allows the panels to be made then the insulation to be applied to the interior of the panels. In another embodiment, the insulation can be a vacuum of air. This helps to keep the portable pet door lightweight, such that the pet door is more easily opened and closed. In other embodiments, the insulation can be a fiberglass insulation. While FIG. 8 shows the interior of the panel without the ribs going therethrough, in other embodiments the insulation is applied between the ribs.

Figure 9:
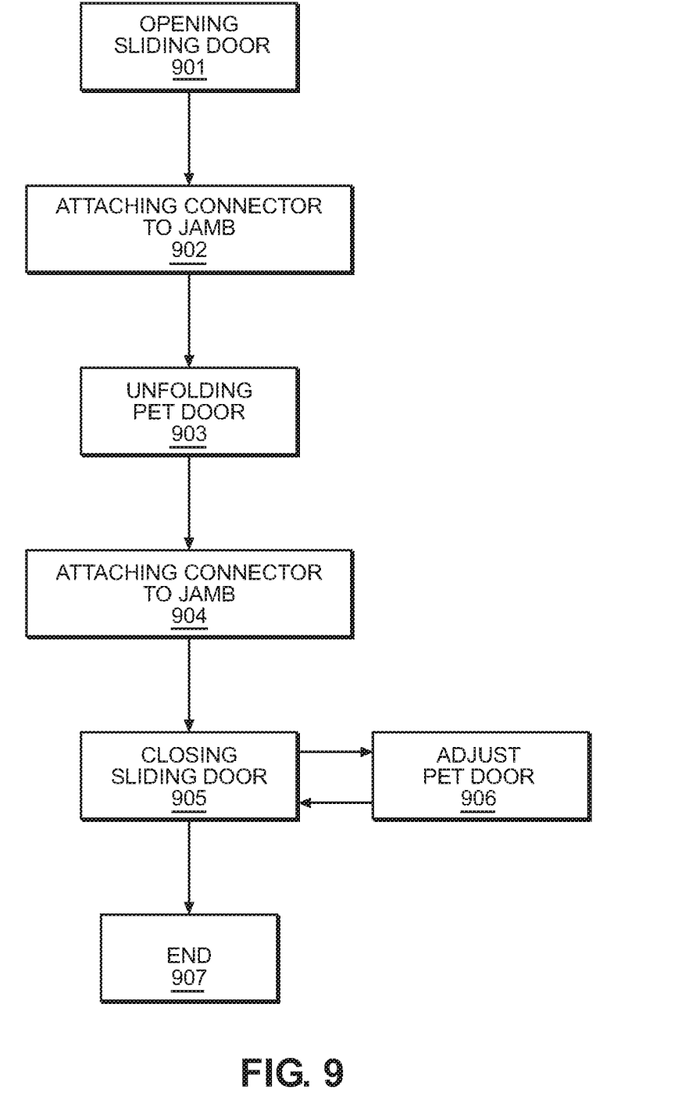
FIG. 9 shows a flow chart to a method of installing the portable pet door in a sliding door jamb.

Referring now to FIG. 9, there is shown a flow chart to a method of installing the portable pet door in a sliding door jamb. The first step 901 in the method is opening a sliding door to a width sufficient to allow the portable pet door to be placed between an inner edge of a sliding door and a doorjamb. A first part of a connector should then be connected to a top part of the door jamb 902. In some instances, an additional connector should then be attached to a side part of the doorjamb. The portable pet door should then be unfolded 903. In the embodiments where the pet flap is removable it should now be attached. The connectors attached to the portable pet door should then be attached to the connector 904 or connectors attached to the door jamb. A side of the pet door should be pressed snug to the door jamb to ensure proper installation. The pet door should then be slid upwards to firmly attach the connectors. The sliding door should then be closed 905 applying pressure to the portable pet door. At this point adjustments may need to be made 906 to ensure the portable pet door is properly installed. In some embodiments an additional door locking stick should now be placed behind the sliding door holding it in place. After the pet door is snuggly in place the method is complete 907.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable pet door, comprising:
   a plurality of panels hingedly connected together, wherein there is at least an upper panel and a lower panel;
   a connector placed on a top portion of the upper panel, wherein the connector can attach the portable pet door to a door jamb; and
   a frameless pet flap removably connected to the lower panel.

2. The portable pet door of claim 1, further comprising: a knob disposed on at least one panel of the plurality of panels.

3. The portable pet door of claim 1, wherein, the pet flap is composed of rubber.

4. The portable pet door of claim 1, wherein, the pet flap is composed of neoprene.

5. The portable pet door of claim 1, further comprising: insulation disposed within an interior portion of each of the plurality of panels.

6. The portable pet door of claim 1, further comprising: a raised portion located on a bottom portion of the pet flap.

7. The portable pet door of claim 6, wherein, the raised portion is weighted so as to bias the pet flap to a vertical, closed position.

8. The portable pet door of claim 1, wherein, the connector is a hook and loop connector.

9. The portable pet door of claim 1, wherein, the plurality of panels have an inner material and an outer material.

10. The portable pet door of claim 9, wherein, the inner material has a series of horizontal ribs disposed therein.

11. The portable pet door of claim 10, further comprising: insulation disposed within the inner material.

12. The portable pet door of claim 9, wherein, the outer material is a hard material.

13. The portable pet door of claim 1, wherein, each of the plurality of panels is a solid piece.

14. The portable pet door of claim 1, wherein said plurality of panels comprises three panels.

15. A portable pet door, comprising:
   a plurality of panels hingedly connected together, wherein there is at least an upper panel and a lower panel;
   a first connector placed on a top portion of the upper panel, wherein the first connector can attach the portable pet door to a top of a door jamb;
   a frameless pet flap removably connected to the lower panel; and
   a weighted raised portion on a lower end of the pet flap.

16. The portable pet door of claim 15, wherein, the pet flap is composed of rubber.

17. The portable pet door of claim 15, further comprising: a second connector located on a side portion of the portable pet door.

18. The portable pet door of claim 17, wherein, the first connector and the second connector are each a hook and loop connector.

19. The portable pet door of claim 15, wherein said plurality of panels comprises three panels.

20. A method for installing a portable pet door, the method comprising:
   providing a pet door having an upper panel hingedly connected to a lower panel;
   providing a frameless pet flap removably connected to the lower panel;
   opening a sliding door;
   attaching a first part of a connector to the top of a door jamb;
   attaching a connector on the pet door to the first part of the connector;
   closing the sliding door.

* * * * *